United States Patent

Miyoshi et al.

Patent Number: 5,561,184
Date of Patent: Oct. 1, 1996

[54] ROOM TEMPERATURE CURABLE SILICONE COMPOSITION

[75] Inventors: Kei Miyoshi, Annaka; Yoshifumi Harada, Haruna-machi, both of Japan

[73] Assignee: Shin-Etsu Chemical Co., Ltd., Tokyo, Japan

[21] Appl. No.: 246,614

[22] Filed: May 20, 1994

[30] Foreign Application Priority Data

May 20, 1993 [JP] Japan .................................. 5-141319

[51] Int. Cl.$^6$ ................................................. C08K 3/26
[52] U.S. Cl. .................... 524/425; 524/434; 524/441; 524/588; 524/730; 524/731; 524/755; 524/783; 524/786; 524/788; 524/863
[58] Field of Search .................... 524/863, 788, 524/783, 786, 588, 425, 441, 434, 731, 730, 755

[56] References Cited

U.S. PATENT DOCUMENTS 3,919,136  11/1975  Smith ....................... 524/730
4,513,115  4/1985   Beers ....................... 524/731
4,892,907  1/1990   Lampe et al. ............... 524/731

*Primary Examiner*—John C. Bleutge
*Assistant Examiner*—Karen A. Dean
*Attorney, Agent, or Firm*—Oblon, Spivak, McClelland, Maier & Neustadt, P.C.

[57] ABSTRACT

A room temperature curable silicone composition, comprising (A) 100 parts by weight of an organopolysiloxane each of both ends of which has one hydroxyl group, (B) 0.2 to 40 parts by weight of at least one compound selected from the group consisting of hydrolyzable silanes having 2 to 4 hydrolyzable groups and their partial hydrolysis-condensation products, (C) 1 to 100 parts by weight of a modified diorganopolysiloxane of which both ends have at least one group selected from the group consisting of a hydrogen atom, a substituted monovalent hydrocarbon group and alkoxy group having 1 to 10 carbon atoms, an unsubstituted hydrocarbon group and alkoxy group having 1 to 10 carbon atoms, and a hydroxyl group and that has a silicon-bonded modifying group made up of a substituted or unsubstituted monovalent organic group with 6 or more carbon atoms, and (D) a filler and a cured product thereof. A cured product good in peeling properties can be obtained.

6 Claims, No Drawings

ROOM TEMPERATURE CURABLE SILICONE COMPOSITION

BACKGROUND OF THE INVENTION

1. Field of the Invention

The present invention relates to a silicone composition curable with moisture in the air at room temperature and its cured product, and more particularly to a composition that can produce a cured product good in peelability from almost every adherend and its cured product.

2. Description of the Prior Art

Since silicone rubbers obtained by curing room temperature curable silicone compositions curable with moisture in the air are excellent in adhesion properties as well as in heat resistance, weather resistance, and chemical resistance, the compositions are used widely as adhesives, sealing agents, coating agents, and the like, for example, in the electric and electronic field and in the field of transports.

However, if a room temperature curable silicone composition is used, for example, as a masking material or a packing material and the cured silicone rubber is to be peeled off when necessary, there is a disadvantage that since said silicone rubber is bonded to the adherend, said silicone rubber cannot be easily peeled off and the bonded part has to be ultimately broken.

To obviate this disadvantage, there is suggested a method of eliminating the component in said composition that makes said composition adhesive. However, although that method can give peelability to a certain extent, for an adherend having a large amount of active groups on the surface, such as glass, if the cured product is allowed to stand for a long period of time or is heated, the adhesion cannot be prevented.

There is also suggested a method wherein an acetamide compound as a peeling auxiliary is added to an acetone-elemination type silicone composition. However, it is a disadvantage that if said composition to which said peeling auxiliary is added is stored for a long period of time, said peeling auxiliary separates or even after the curing the peeling auxiliary migrates to the surface thereby impairing the appearance.

SUMMARY OF THE INVENTION

An object of the present invention is to provide a room temperature curable silicone composition that can produce a silicone cured product which adheres to an adherend favorably without damaging such properties as heat resistance, weather resistance, and chemical resistance and has suitable peeling properties when necessary and its cured product.

The present invention provides a room temperature curable silicone composition, comprising (A) 100 parts by weight of an organopolysiloxane represented by the general formula (1):

$$HO-[Si(R^1)_2O]_n-H \qquad (1)$$

wherein $R^1$'s, which are the same or different, each represent a substituted or unsubstituted monovalent hydrocarbon group having 1 to 10 carbon atoms and n is an integer of 1 or more, (B) 0.2 to 40 parts by weight of at least one compound selected from the group consisting of a hydrolyzable silane represented by the general formula (2):

$$(R^2)_a SiX_{4-a} \qquad (2)$$

and its partial hydrolysis-condensation product wherein $R^2$ represents a substituted or unsubstituted monovalent hydrocarbon group having 1 to 10 carbon atoms, X represents a hydrolyzable group, a is an integer of 0 to 2, and if a is 2, $R^2$'s are the same or different product, 1 to 100 parts by weight of a modified diorganopolysiloxane of which both ends have at least one group selected from the group consisting of a hydrogen atom, a substituted monovalent hydrocarbon group having 1 to 10 carbon atoms, a substituted alkoxy group having 1 to 10 carbon atoms, an unsubstituted hydrocarbon group having 1 to 10 carbon atoms, an unsubstituted alkoxy group having 1 to 10 carbon atoms, and a hydroxyl group; and that has a silicon-bonded substituted or unsubstituted monovalent organic group with 6 or more carbon atoms (hereinafter referred to modifying group), and (D) a filler.

Further, the present invention provides a cured product obtained by curing the above room temperature curable silicone composition.

The cured product obtained by curing the room temperature curable composition of the present invention has such properties as heat resistance, weather resistance, and chemical resistance, adheres to an adherend favorably, and possesses suitable peeling properties when necessary. Therefore, where the composition of the present invention is used, for example, as a masking material and a packing material used in electric and electronic parts, transports, etc., it is quite useful.

DETAILED DESCRIPTION OF THE INVENTION

Component (A)

The organopolysiloxane, the component (A), is a compound having a hydroxyl group at both ends represented by the general formula (1):

$$HO-[Si(R^1)_2O]_n-H \qquad (1)$$

wherein $R^1$ and n have the meanings as defined above.

In said general formula (1), $R^1$ is a an optionally substituted monovalent hydrocarbon group having 1 to 10 carbon atoms, preferably 1 to 8 carbon atoms. $R^1$'s are the same or different. Specific examples of $R^1$ include an alkyl group, such as a methyl group, an ethyl group, a butyl group, and a hexyl group; an aryl group, such as a phenyl group and a tolyl group; an alkenyl group, such as a vinyl group, an allyl group, a butenyl group, and a hexenyl group; an aralkyl group, such as a cyclohexyl group; and corresponding substituted groups that are formed by replacing part or all of the hydrogen atoms of the above hydrocarbon groups by halogen, cyano, or the like, such as a chloromethyl group, a trifuloropropyl group, and a cyanoethyl group.

Further, n in the general formula (1) is a number indicating the degree of polymerization and if n is an integer of 1 or more, there are no particular restrictions, but taking the workability into consideration, an organopolysiloxane having such a degree of polymerization that generally the viscosity at 25° C. is 100 to 1,000,000 cP, preferably 700 to 100,000 cP, is used.

Component (B)

The component (B) is at least one compound selected from the group consisting of a hydrolyzable silane represented by the general formula (2):

$(R^2)_a SiX_{4-a}$ (2)

wherein $R^2$, X, and a have the meanings as defined above and its partial hydrolysis-condensation product. The component (B) is used for crosslinking the component (A).

In the above general formula (2), $R^2$ represents an optionally substituted monovalent hydrocarbon group having 1 to 10 carbon atoms, preferably 1 to 8 carbon atoms. If a is a number of 2, $R^2$'s are the same or different. Examples of $R^2$ are the same groups as those mentioned as examples of $R^1$ in the above formula (1) and taking the availability into consideration, $R^2$ is preferably a methyl group, an ethyl group, a vinyl group, or a phenyl group.

In general formula (2), X represents a hydrolyzable group and X's are the same or different. Specific examples of X include an alkoxy group, such as a methoxy group, an ethoxy group, and a butoxy group; an iminoxy group, such as a methylethylketooxymino group; an alkenoxy group, such as an isopropenoxy group, and an acyloxy group, such as a acetoxy group.

In the case where the present composition is used for electrical and electronic parts, preferably X in the general formula (2) is at least one group selected from the group consisting of an alkoxy group and an alkenoxy group that cause no problems, such as corrosion.

Specific examples of the component (B) include methyltrimethoxysilane, vinyltrimethoxysilane, phenyltriethoxysilane, dimethyldimethoxysilane, vinyltris(methylethylketooxymino)silane, phenyltriisopropenoxysilane, and methyltriacetoxysilane, and their partial hydrolysis-condensation products, i.e., oligomers thereof.

The amount of the component (B) to be added is in the range of 0.2 to 40 parts by weight, preferably 3 to 20 parts by weight, per 100 parts by weight of the above component (A). If the amount of the component (B) to be added is less than 0.2 part by weight, there is a fear that the composition is not cured satisfactorily, while if the amount is over 40 parts by weight, the cured product becomes hard, brittle and poor in durability.

Component (C)

The component (C), the modified diorganopolysiloxane, acts as a peeling property improver. This is assumed in such a way that the component (C) modifies the surface of the obtained cured product in the curing process to make the surface of the cured product not reactive to the adherend.

The component (C) has at both the ends a group selected from the group consisting of a hydrogen atom, a substituted monovalent hydrocarbon group having 1 to 10 carbon atoms, a substituted alkoxy group having 1 to 10 carbon atoms, an unsubstituted hydrocarbon group having 1 to 10 carbon atoms, an unsubstituted alkoxy group having 1 to 10 carbon atoms, and a hydroxyl group and the groups present at both ends are the same or different.

Further, the component (C) has a silicon-bonded modifying group made up of a substituted or unsubstituted monovalent organic group with 6 or more carbon atoms, preferably 6 to 3,000 carbon atoms, which may have an ether linkage and/or an ester linkage. The ratio of the content of the modifying group is preferably 0.1 mol % or more, more preferably 1 to 50 mol %, in the silicon-bonded organic group.

The above modifying group includes, for example, a long-chain alkyl group represented by $(CH_2)_i$—$CH_3$ wherein i is an integer of 5 to 17, ether chain-containing groups represented, for example, by —$C_3H_6(CH_2CH_2O)_jH$, —$C_3H_6(CH_2CH_2O)_jCH_3$, —$C_3H_6(CH_2CHCH_3O)_kCH_2CH_3$, and —$C_3H_6(CH_2CH_2O)_j(CH_2CHCH_3O)_kH$ wherein j is an integer of 1 to 1,400 and k is an integer of 1 to 990, and aromatic group-containing groups, such as —$C_3H_6$—$(C_6H_5)$ and —$C_2H_4$—$(C_6H_4)$—$CH_3$. Out of these, an alkyl group having 6 to 18 carbon atoms and a polyoxyethylene chain- and/or polyoxypropylene chain-containing group are preferable.

In the case where the component (C) contains such several modifying groups, and part of the modifying groups is an alkyl group having 6 to 18 carbon atoms, and the rest is an organic group having a polyoxyethylene chain- and/or polyoxypropylene chain-containing organic group, that is, in the case where the component (C) is one generally called alkyl polyether comodified siloxane, the cured product obtained by curing the present composition exhibits excellent peelability. However, in the case of such a comodified polysiloxane, the process for the manufacture is complicated, there is a possibility that the physical properties of the obtained polysiloxane are scattered, and the cost is high. Therefore, except for a special application where, for example, the composition of the present invention is used under very severe conditions, use of such a comodified polysiloxane has few advantages.

Further, in addition to the above modifying group as a silicon-bonded organic group, the component (C) has a substituted or unsubstituted monovalent hydrocarbon group having 1 to 10 carbon atoms, preferably 1 to 8 carbon atoms. Specific examples of the monovalent hydrocarbon group include the same groups as those mentioned as examples of $R^1$ in the above formula (1).

The component (C) has generally a viscosity of 1 to 100,000 cP, preferably 10 to 20,000, at 25° C.

Specific examples of the component (C) include modified organopolysiloxanes represented by the general formula (3):

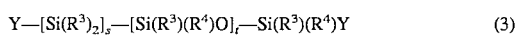

$Y-[Si(R^{3'})_2]_s-[Si(R^{3'})(R^4)O]_t-Si(R^{3'})(R^4)Y$ (3)

wherein $R^{3'}$, which are the same or different, each represent a substituted or unsubstituted monovalent hydrocarbon group having 1 to 10 carbon atoms, $R^4$ represents a modifying group made up of a substituted or unsubstituted monovalent organic group having 6 or more carbon atoms that optionally has an ether linkage and/or an ester linkage, if there are two or more $R^4$'s, they are the same or different, Y's, which are the same or different, each represent at least one group selected from the group consisting of a hydrogen atom, a substituted monovalent hydrocarbon group and alkoxy group having 1 to 10 carbon atoms, an unsubstituted hydrocarbon group and alkoxy group having 1 to 10 carbon atoms, and a hydroxyl group, s is an integer of 1 to 1,000, and t is an integer of 0 to 999.

The amount of the component (C) to be added is in the range of 1 to 100 parts by weight, preferably 3 to 50 parts by weight, per 100 parts by weight of the component (A). In the case where the amount of the component (C) is less than 1 part by weight, if the composition of the present invention is cured, although there is no problem regarding the initial peelability, there is a fear that after passage of a long period of time the cured product adheres to drop the peelability while in the case where the amount is over 100 parts by weight, depending on the structure of the component (C) the physical properties of the cured product lower extremely not to secure enough strength as a cured product.

Component (D)

The component (D), the filler, is used as a reinforcing agent or a bulking filler and it is recommended that, as the compound (D), fillers generally known to those skilled in the art are used. Examples include fumed silica, calcium carbonate, zinc carbonate, aluminum hydroxide, and precipitated silica. Preferably the amount of the component (D) to be added is 1 to 200 parts by weight per 100 parts by weight of the component (A).

Other component

The composition of the present invention preferably contains (E) a catalyst. It is recommended that, as the catalyst, catalysts generally known to those skilled in the art are used. For instance, a tin catalyst, a titanium catalyst and the like can be used. Specific examples include organotin compounds, such as tin naphthenate, tin caprylate, tin oleate, dibutyltin diacetate, dibutyltin dioctate, dibutyltin dilaurate, dibutyltin dioleate, diphenyltin diacetate, dibutyltin oxide, dibutyltin dimethoxide, dibutylbis(triethoxysiloxy) tin, and dibutyltin benzylmalate; and titanium chelate compounds and titanates, such as tetraisopropoxytitanium, tetra-n-butoxytitanium, tetrabis(2-ethylhexoxy) titanium, dipropoxybis(acetylacetonato)titanium, and titanium isopropoxyoctylene glycol.

The amount of the component (E) to be added is generally in the range of 0.01 to 10 parts by weight, preferably 0.1 to 1 part by weight, per 100 parts by weight of the component (A).

Preparation of the Composition

The composition of the present invention can be prepared easily by mixing uniformly required amounts of the above components.

The composition of the present invention is easily cured with moisture in the air to form a cured product. As apparent from the below-described Examples, since this cured product is good in peelability, it is quite useful to be used, for example, as a masking material and a packing material for use, for example, in electrical and electronic parts and transports.

EXAMPLES

Now, the present invention will be described with reference to the following Examples, but the present invention is not restricted to the Examples. In the Examples, the viscosity was measured at 25° C.

Example 1

100 parts by weight of α,Ω-dihydroxydimethylpolysiloxane having a viscosity of 20,000 cP, 10 parts by weight of fumed silica (specific surface: 150 m²/g) which had been surface-treated with dimethyldichlorosilane, and 7 parts by weight of a dimethylpolysiloxane (viscosity: 100 cP) wherein both ends are blocked with a trimethylsilyl group and 10 mol % of the silicon-bonded organic groups is modified with a polyethylene oxide having an average molecular weight of 1,000 were charged into a universal mixer and were mixed to obtain a base compound. 5 parts by weight of methyltris(methylethylketooxymino)silane and 0.1 part by weight of dibutyltin dioctoate were mixed with 100 parts by weight of this base compound under reduced pressure to obtain the intended composition.

The composition was subjected to a peelability test in the following manner. The results are shown in Tables 1 to 3.

Peelability Test

As adherends, glass plates, aluminum plates, and epoxy resin plates whose surfaces were cleaned with a solvent were used.

The above composition was applied to each of the adherends to form the shape of a semicircular column of the composition and the composition was allowed to stand for 7 days under conditions at 20° C. and 55 % RH to prepare a test specimen. Four such test specimens were prepared for each adherend.

The peelability of the cured product from the adherends was checked at the initial stage, and after standing for 2 weeks, 4 weeks, and 8 weeks in a dryer at 100° C. The evaluation of the peelability was carried out as follows.

A: the cured product was easily peeled off.

B: adhesion was strong and the cured product was difficult to be peeled off.

C: the cured product was bonded and could not be peeled off.

Example 2

100 parts by weight of α,Ω-dihydroxydimethylpolysiloxane having a viscosity of 5,000 cP, 60 parts by weight of colloidal calcium carbonate which had been surface-treated with a resin acid soap, and 8 parts by weight of a dimethylpolysiloxane (viscosity: 300 cP) wherein both ends are blocked with a trimethylsilyl group and 5 mol of the silicon-bonded organic groups is modified with a polypropylene oxide having an average molecular weight of 500 were charged into a universal mixer and were mixed to obtain a base compound. 8 parts by weight of phenyltriisopropenoxysilane and 0.5 part by weight of N,N,N',N'-tetramethylguanidylpropyltrimethoxysilane (a cure catalyst) were mixed with 100 parts by weight of this base compound under reduced pressure to obtain the intended composition.

The obtained composition was subjected to a peelability test in the same way as in Example 1. The results are shown in Tables 1 to 3.

Example 3

100 parts by weight of α,Ω-dihydroxydimethylpolysiloxane having a viscosity of 20,000 cP, 10 parts by weight of fumed silica (specific surface: 150 m²/g) which had been surface-treated with dimethyldichlorosilane, and 10 parts by weight of a dimethylpolysiloxane (viscosity: 100 cP) wherein both ends are blocked with a trimethylsilyl group and 10 mol % of the silicon-bonded organic groups is modified with α-methylstylene were charged into a universal mixer and were mixed to obtain a base compound. 6 parts by weight of vinyltriacetoxysilane was mixed with 100 parts by weight of this base compound under reduced pressure to obtain the intended composition.

The obtained composition was subjected to a peelability test in the same way as in Example 1. The results are shown in Tables 1 to 3.

Example 4

100 parts by weight of α,Ω-dihydroxydimethylpolysiloxane having a viscosity of 20,000 cP, 10 parts by weight of fumed silica (specific surface: 150 m²/g) which had been surface-treated with dimethyldichlorosilane, and 10 parts by weight of a dimethylpolysiloxane (viscosity: 100 cP) wherein both ends are blocked with a trimethylsilyl group, 5 mol % of the silicon-bonded organic groups is modified with α-methylstylene, and 5 mol % of the silicon-bonded organic groups is modified with a polypropylene oxide having a molecular weight of 4,000 were charged into a universal mixer and were mixed to obtain a base compound. 6 parts by weight of vinyltris(methylethylketooxymino)silane and 0.1 part by weight of dibutyltin malate were mixed with 100 parts by weight of this base compound under reduced pressure to obtain the intended composition.

The obtained composition was subjected to a peelability test in the same way as in Example 1. The results are shown in Tables 1 to 3.

Comparative Example 1

100 parts by weight of α,Ω-dihydroxydimethylpolysiloxane having a viscosity of 20,000 cP and 10 parts by weight of fumed silica (specific surface: 150 m²/g) which had been surface-treated with dimethyldichlorosilane were charged into a universal mixer and were mixed to obtain a base compound. 5 parts by weight of methyltris(methylethylketooxymino)silane and 0.1 part by weight of dibutyltin dioctoate were mixed with 100 parts by weight of this base compound under reduced pressure to obtain the intended composition.

The obtained composition was subjected to a peelability test in the same way as in Example 1. The results are shown in Tables 1 to 3.

Comparative Example 2

100 parts by weight of α,Ω-dihydroxydimethylpolysiloxane having a viscosity of 20,000 cP, 10 parts by weight of fumed silica (specific surface: 150 m²/g) which had been surface-treated with dimethyldichlorosilane, and 20 parts by weight of a dimethylpolysiloxane wherein both ends are blocked with a trimethylsilyl group were charged into a universal mixer and were mixed to obtain a base compound. 5 parts by weight of methyltris(methylethylketooxymino)silane and 0.1 part by weight of dibutyltin dioctoate were mixed with 100 parts by weight of this base compound under reduced pressure to obtain the intended composition.

The obtained composition was subjected to a peelability test in the same way as in Example 1. The results are shown in Tables 1 to 3.

TABLE 1

| | Adherend: glass | | | | | |
|---|---|---|---|---|---|---|
| | Example 1 | Example 2 | Example 3 | Example 4 | Comparative Example 1 | Comparative Example 2 |
| Initial stage | A | A | A | A | C | C |
| After 2 weeks | A | A | A | A | C | C |
| After 4 weeks | A | A | A | A | C | C |
| After 8 weeks | B | B | B | A | C | C |

TABLE 2

| | Adherend: aluminum | | | | | |
|---|---|---|---|---|---|---|
| | Example 1 | Example 2 | Example 3 | Example 4 | Comparative Example 1 | Comparative Example 2 |
| Initial stage | A | A | A | A | A | A |
| After 2 weeks | A | A | A | A | C | C |
| After 4 weeks | A | A | A | A | C | C |
| After 8 weeks | B | B | B | A | C | C |

TABLE 3

| | Adherend: epoxy resin | | | | | |
|---|---|---|---|---|---|---|
| | Example 1 | Example 2 | Example 3 | Example 4 | Comparative Example 1 | Comparative Example 2 |
| Initial stage | A | A | A | A | C | C |
| After 2 weeks | A | A | A | A | C | C |
| After 4 weeks | A | A | A | A | C | C |
| After 8 weeks | B | B | B | A | C | C |

We claim:

1. A room temperature curable silicone composition, comprising (A) 100 parts by weight of an organopolysiloxane represented by the general formula (1):

$$\text{HO—[Si}(R^1)_2\text{O}_n\text{—H} \tag{1}$$

wherein $R^1$'s, which are the same or different, each represent a substituted or unsubstituted monovalent hydrocarbon group having 1 to 10 carbon atoms and n is an integer of 1 or more, (B) 0.2 to 40 parts by weight of at least one compound selected from the group consisting of a hydrolyzable silane represented by the general formula (2):

$$(R^2)_a SiX_{4-a} \quad (2)$$

and its partial hydrolysis-condensation product; wherein $R^2$ represents a substituted or unsubstituted monovalent hydrocarbon group having 1 to 10 carbon atoms, X is at least one group selected from the group consisting of an alkoxy group and an alkenoxy group, a is an integer of 1 to 2, and if a is 2, $R_2$'s are the same or different, (C) 1 to 100 parts by weight of a modified diorganopolysiloxane of which both ends have at least one group selected from the group consisting of a hydrogen atom, a substituted monovalent hydrocarbon group having 1 to 10 carbon atoms, a substituted alkoxy group having 1 to 10 carbon atoms, an unsubstituted hydrocarbon group having 1 to 10 carbon atoms, an unsubstituted alkoxy group having 1 to 10 carbon atoms, and a hydroxyl group; and that has a silicon-bonded polyoxyalkylene chain group with 6 or more carbon atoms, and (D) a filler.

2. A room temperature curable silicone composition as claimed in claim 1, wherein the component (A) has a viscosity of 100 to 1,000,000 cP at 25° C.

3. A room temperature curable silicone composition as claimed in claim 1, wherein the content of said silicon-bonded substituted or unsubstituted monovalent organic group possessed by the component (C) is 0.1 mol % or more in the silicon-bonded organic groups.

4. A room temperature curable silicone composition as claimed in claim 1, wherein said silicon-bonded polyoxyalkylene chain group possessed by the component (C) is at least one group selected from the group consisting of a polyoxyethylene chain-containing group, and a polyoxypropylene chain-containing group.

5. A room temperature curable silicone composition as claimed in claim 1, further comprising (E) a catalyst.

6. A cured product obtained by curing a room temperature curable silicone composition as claimed in claim 1.

* * * * *